G. P. SMITH.
LOCK FOR AUTOMOBILE CLUTCH LEVERS.
APPLICATION FILED OCT. 10, 1912.
1,066,539.
Patented July 8, 1913.
2 SHEETS—SHEET 2.
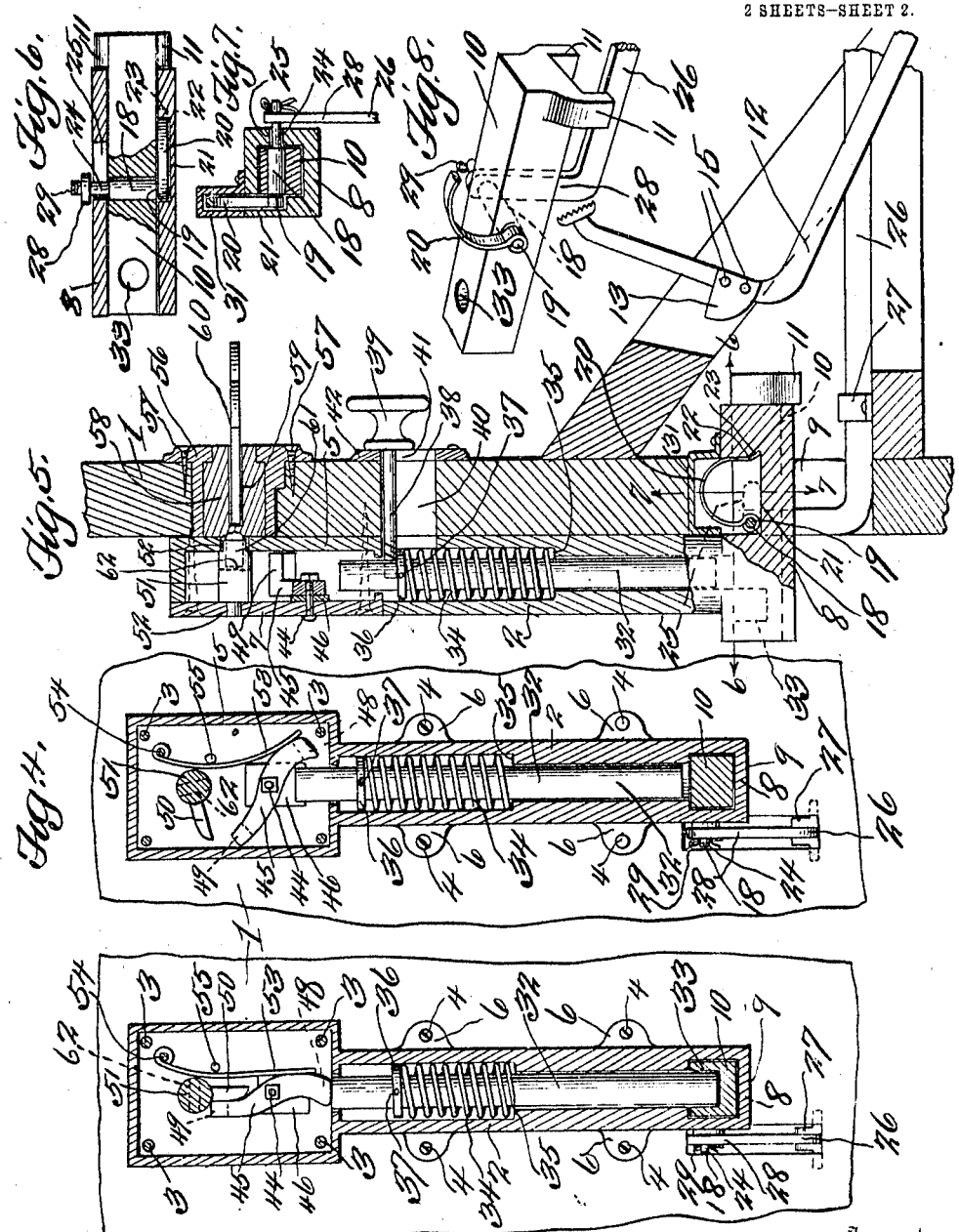

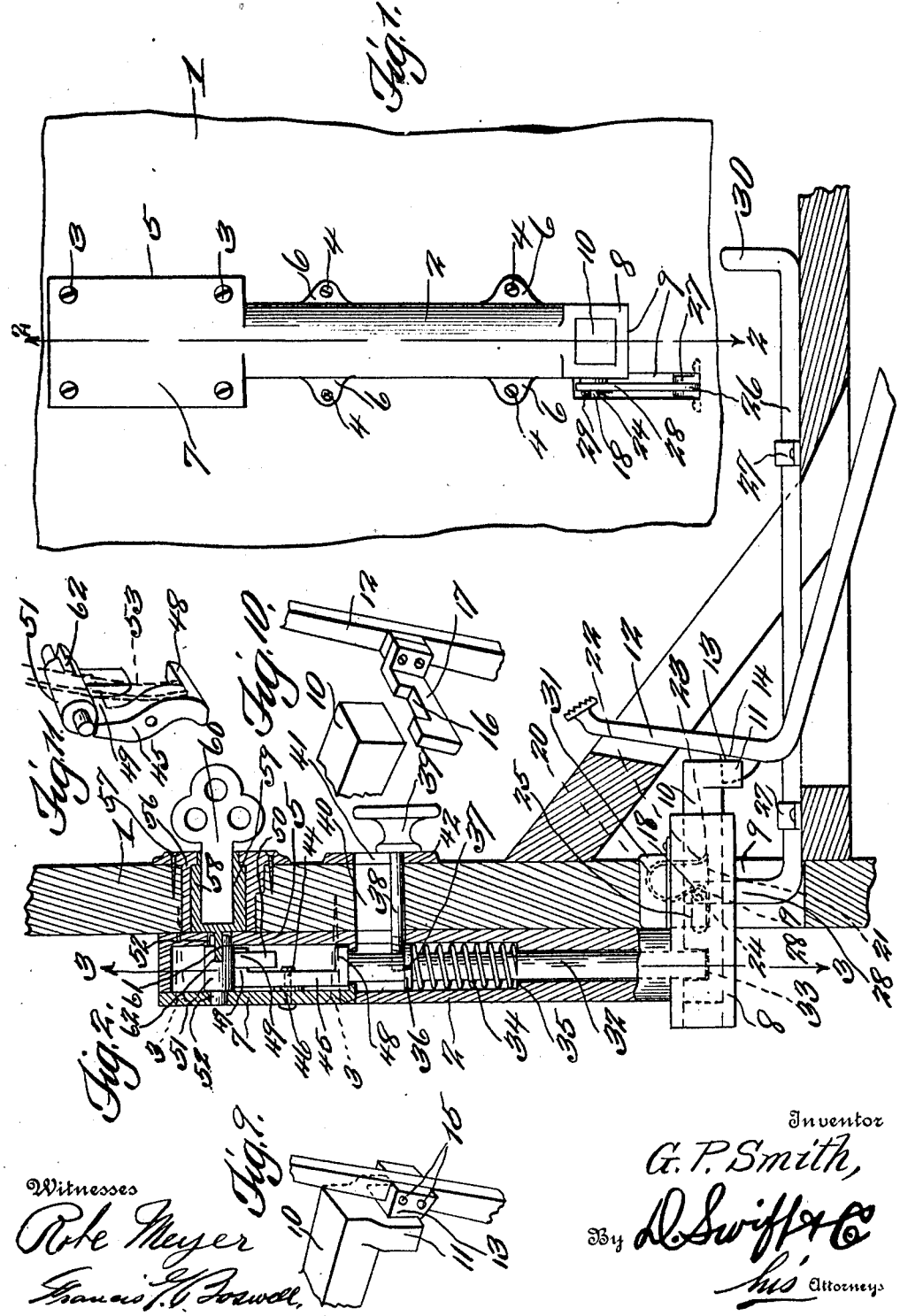

UNITED STATES PATENT OFFICE.

GEORGE P. SMITH, OF ST. LOUIS, MISSOURI, ASSIGNOR OF ONE-HALF TO WILLIAM H. STURGES, OF ST. LOUIS, MISSOURI.

LOCK FOR AUTOMOBILE CLUTCH-LEVERS.

1,066,539.   Specification of Letters Patent.   Patented July 8, 1913.

Application filed October 10, 1912. Serial No. 724,995.

*To all whom it may concern:*

Be it known that I, GEORGE P. SMITH, a citizen of the United States, residing at St. Louis, in the State of Missouri, have invented a new and useful Lock for Automobile Clutch-Levers; and I do hereby declare the following to be a full, clear, and exact description of the invention, such as will enable others skilled in the art to which it appertains to make and use the same.

This invention relates to a new and useful lock mechanism for automobile clutch levers.

As one of the objects of the invention it is the aim to provide a lock mechanism of this nature for securely locking such clutch levers in such a position, as to prevent the machine from being operated, other than by the chauffeur or the owner.

Another object of the invention is the provision of two or more bolts and a pivoted member or tumbler co-acting together, and adapted to be actuated by any form of " Yale " barrel or other mechanism, for locking or releasing the clutch lever. When locking the clutch lever one of the aforesaid bolts is actuated by a foot rod, so that a lug on the clutch lever may be engaged by the aforesaid bolts.

In the drawings there are disclosed certain features of construction, but in practical fields these features may necessitate alterations, to which the patentee is entitled, provided the alterations are comprehended within the scope of what is claimed.

Further features and combination of parts are hereinafter set forth, shown in the drawings and claimed.

In the drawings:—Figure 1 is a view in elevation of a portion of a dash board of an automobile, showing the locking mechanism as applied thereto. Fig. 2 is a sectional view on line 2—2 of Fig. 1, showing the two or more co-acting bolts and tumbler, partly in dotted lines, and in elevation, for locking the clutch lever against being actuated. Fig. 3 is a sectional view on line 3—3 of Fig. 2. Fig. 4 is a view similar to Fig. 3, showing the bolts and the tumbler in readiness to be actuated. Fig. 5 is a view similar to Fig. 2, showing the clutch lever unlocked, and the co-acting bolts and tumbler in readiness to be actuated. Fig. 6 is a sectional view on line 6—6 of Fig. 5. Fig. 7 is a sectional view on line 7—7 of Fig. 5. Fig. 8 is a detail perspective view of the bolt, which engages a lug of the clutch lever for locking the same. Fig. 9 is a detail perspective view of a portion of the bolt shown in Fig. 8, and showing the same in engagement with the lug of the clutch lever. Fig. 10 is a detail perspective view of a portion of another form of bolt as shown in Figs. 8 and 9, to engage a different form of lug on the clutch lever. Fig. 11 is a detail view in perspective, showing the tumbler to be oscillated by an arm of a rocking member, which in turn is actuated by any form of " Yale " barrel or other locking mechanism.

Referring more particularly to the drawings 1 designates a portion of a dash board of an automobile, to which a casing in the form of a casting or the like 2 is secured by the screws or other means 3 and 4. The upper portion of the casing is in the form of a rectangular boxing or the like 5, through which the screws 3 pass and into the dash board 1, while the lower portion of the casing is cylindrical and provided with ears 6, through which the screws 4 pass into the dash board 1. The rectangular boxing 5 is provided with a cover 7. The screws 3 not only assist in securing the casing to the dash board, but also secure the cover 7 in place.

The lower end portion of the cylindrical portion of the casing 2 terminates in a supplemental casing 8, which extends at right angles to the casing 2. The casing 8 extends through an opening 9 of the dash board, and has slidably mounted therein a bolt 10, at one end of which downwardly extending lugs or ears 11 are formed, one upon each side of the bolt. A conventional form of automobile clutch lever is disclosed in the drawing, and to which clutch lever 12 a lug 13 is integrally or detachably connected, as shown at 14 in Fig. 2, and at 15 in Figs. 5 and 9. It is immaterial, however, how the lug 13 is connected to the clutch lever. This lug 13, when the clutch lever is depressed, as shown in Fig. 2, is designed to engage under the bolt 10, and between the lugs or ears 11, that is, when the bolt 10 is partially withdrawn from the casing 8, as shown in Fig. 2. In Fig. 10, the lugs or ears 11 are dispensed with, and the bolt 10 is designed to engage a notch or recess 16 of a different form of lug 17 carried by the clutch lever 12.

The bolt 10 has a pin 18 extending transversely thereof, to the reduced end 19 of which a bowed spring 20 is connected, as shown clearly in Figs. 2, 5, 6, 7 and 8. The reduced end 19 of the pin with the connected end of the spring 20 moves partially in a cutaway portion or recess 21 of the casing 8, while the end 22 of the spring is seated in a notch 23 of the recess or cutaway portion, so as to hold the spring anchored in place at one end. The other end of the pin 18 terminates in a reduced portion 24, which moves in a slot 25 of the casing 8. The slot 25 is formed in the casing opposite the recess or cutaway portion 21.

To move the bolt 10 a foot rod 26 mounted slidably in the bearings 27 is provided. The upturned end 28 of the foot rod 26 is secured on the reduced portion 24 of the pin 18, by means of the cotter pin 29. The rear portion of the foot rod 26 terminates in another upturned end 30, with which the heel of the shoe of an operator engages, so as to reciprocate the foot rod 26 rearwardly, which in turn will withdraw the bolt 10 partially from the casing 8. At the same time the foot rod 26 is thus actuated, the ball of the foot of the operator depresses the clutch lever 12, so as to throw the lug 13 in engagement with the bolt 10. The spring 20 may or may not be covered by the shield or hood 31.

When the bolt 10 is withdrawn, the same is locked, owing to the bolt 32 being thrown downwardly to engage the recess 33 of the bolt 10, against the action of the coil spring 34. The bolt 32 is mounted in the casing 2, while the coil spring 34 is interposed between the shoulder 35 and the collar 36 of the bolt 32. This collar 36 is secured upon the bolt 32 by the pin 37. When the bolt 32 is in a raised position its upper end portion partially enters the boxing 5. A pin or bolt 38 is threaded into the bolt 32, and is provided with a thumb head 39. The pin or bolt 38 is designed to move in the slots or openings 40 and 41 of the dash board and the plate 42, against which the thumb head 39 frictionally contacts, but not enough to retard the movement of the bolt 32, or bind the bolt 38, but just sufficient to guide said parts. Pivoted in the boxing 5 upon the bolt or pin 44 is a tumbler 45, there being a washer plate 46 between the tumbler and the cover 7, in order to lessen frictional contact between the tumbler and the cover. This tumbler 45 is provided at each end with a laterally extending arm. The lower arm 48 is designed to engage the upper end of the bolt 32, to hold the same downwardly depressed and in engagement with the recess 33 of the bolt 10. The upper arm 49 of the tumbler is adapted to be engaged by the arm 50 of the revoluble or rocking member 51, which is mounted in bearings 52 of the boxing 5. When the member 51 is rocked, reference being had to Fig. 3, the arm 50 engages the arm 49 of the tumbler 45, in order to tilt the same upon its pivot 44, against the action of the leaf spring 53, thus throwing the arm 48 from the path of the upper end of the bolt 32, so as to permit said bolt 32 to assume a position as shown in Fig. 4. When the bolt 32 is in this manner released, the bolt 10 is in turn released, the same being returned to the position shown in Fig. 5, by the action of the spring 20. The spring 53 is secured upon the pin or bolt 54 and engages the pin 55, so as to insure the proper tension.

It is to be remembered that any suitable "Yale" barrel mechanism may be provided for operating the rocking member 51, for it is immaterial what character of structure, as far as the present invention is concerned, is utilized. For illustrative purposes this "Yale" barrel mechanism may consist of a casing 56 secured in the dash board by the screws 57 and having a barrel 58 rotatable therein, which barrel 58 is provided with a key opening 59 to receive any suitable form of key 60, whereby the barrel may be rotated. This barrel is supplied with a tongue 61, which enters a slot 62 in the member 51. When the barrel 58 is rotated by virtue of the key 60, the member 51 is in turn rocked in its bearings, thus causing the arm 50 to contact with the arm 49, thereby oscillating the tumbler 45.

To release the clutch lever 12, the key 60 is turned in the proper direction, in order to oscillate the tumbler, to the position shown in Fig. 4, thus releasing the bolt 32, which in turn releases the bolt 10 from engagement with the lug 13, and when the lug and the bolt 10 are thus disengaged, the clutch lever 12 is allowed to assume the position shown in Fig. 5.

From the foregoing in conjunction with the annexed drawings it will be ascertained that there has been devised a novel, efficient, simple and desirable locking mechanism for automobile clutch levers, and one which has been found through various experiences to be practical.

The invention having been set forth, what is claimed as new and useful is:—

1. In combination with a member to be locked and having a projection, a casing fixed transversely of a dash board and having a slot in one side, a bolt in said casing having a pin extending through said slot, a reciprocating foot bar having upturned ends, one of which is connected to said pin, while the other is adapted to be engaged by the heel of an operator's foot in order to actuate the reciprocating foot bar at the same time the member is actuated by the ball of the operator's foot, thus constituting means to throw the bolt in engagement with the lug of the member, and a spring interposed between a portion of the casing and said pin, against the action of which spring the bolt is actuated, a tubular casing rising from the first casing and terminating in a box-like casing at its upper end, and means located in the tubular casing and the box like casing for locking said bolt when actuated.

2. In combination with a member to be locked and having a projection, a casing fixed transversely of a dash board and having a slot in one side, a bolt in said casing having a pin extending through said slot, a reciprocating foot bar having upturned ends, one of which is connected to said pin, while the other is adapted to be engaged by the heel of an operator's foot in order to actuate the reciprocating foot bar at the same time the member is actuated by the ball of the operator's foot, thus constituting means to throw the bolt in engagement with the lug of the member, and a spring interposed between a portion of the casing and said pin, against the action of which spring the bolt is actuated, a tubular casing rising from the first casing and terminating in a box-like casing at its upper end, and means located in the tubular casing and the box like casing for locking said bolt when actuated, said means comprising a spring retained lock bolt in the tubular casing, an oscillatory tumbler fulcrumed in the box like casing, a spring for automatically throwing the tumbler in the path of the said second bolt, said second bolt having a hand piece whereby the same is actuated to lock it in engagement with the first bolt, and a device for oscillating the tumbler from the path of the second bolt.

3. In combination with a member to be locked and having a projection, a casing fixed transversely of a dash board and having a slot in one side, a bolt in said casing having a pin extending through said slot, a reciprocating foot bar having upturned ends, one of which is connected to said pin; while the other is adapted to be engaged by the heel of an operator's foot in order to actuate the reciprocating foot bar at the same time the member is actuated by the ball of the operator's foot, thus constituting means to throw the bolt in engagement with the lug of the member, and a spring interposed between a portion of the casing and said pin, against the action of which spring the bolt is actuated, a tubular casing rising from the first casing and terminating in a box like casing at its upper end, and means located in the tubular casing and the box like casing for locking said bolt when actuated, said bolt having a notch, said means comprising a spring retained lock bolt in the tubular casing to engage said notch of the first bolt, an oscillatory tumbler fulcrumed in the box like casing, a spring for automatically throwing the tumbler in the path of said second bolt, said second bolt having a hand piece for actuating the same to lock it in engagement with the notch of the first bolt, and a device for oscillating the tumbler from the path of the second bolt.

4. In combination with a member to be locked and having a projection, of means to engage the projection for locking the member, a casing adapted to be connected to a fixed member of an automobile, a manually depressed bolt to engage said means for locking the same, and an oscillatory tumbler automatically actuated to a position in the path of the bolt for locking the same, and a device for tilting said oscillatory tumbler from the path of said bolt to release the same, which in turn releases said first named means there allowing it to disengage the said projection.

5. In combination with a member to be locked and having a projection, of means to engage the projection for locking the member, a casing adapted to be connected to a fixed member of an automobile, a manually depressed bolt to engage said means for locking the same, an oscillatory tumbler to be thrown in the path of the bolt for locking the same, and a spring for automatically actuating said tumbler.

6. In combination with a member to be locked and having a projection, of means to engage the projection for locking the member, a casing adapted to be connected to a fixed member of an automobile, a manually depressed bolt to engage said means for locking the same, an oscillatory tumbler to be thrown in the path of the bolt for locking the same, and a spring for automatically actuating said tumbler, a device adapted to be actuated for operating the tumbler against the action of the spring to throw the tumbler from the path of said bolt, to release the same, and when released the first named means will be disengaged from said projection.

In testimony whereof I have signed my name to this specification in the presence of two subscribing witnesses.

GEORGE P. SMITH.

Witnesses:
   JOHN A. FRITZ,
   FRANK G. SMITH.